C. E. ATKINSON.
HOSE OR PIPE COUPLING.
APPLICATION FILED MAR. 8, 1909.

942,047.

Patented Dec. 7, 1909.

C. E. Atkinson,
Inventor

UNITED STATES PATENT OFFICE.

CHARLES E. ATKINSON, OF RICHMOND, INDIANA.

HOSE OR PIPE COUPLING.

942,047.  Specification of Letters Patent.  Patented Dec. 7, 1909.

Application filed March 8, 1909. Serial No. 481,964.

*To all whom it may concern:*

Be it known that I, CHARLES E. ATKINSON, a citizen of the United States, residing in the city of Richmond, in the county of Wayne and State of Indiana, have invented a new and useful Hose or Pipe Coupling, of which the following is a full, clear, and comprehensive specification, being such as will enable others to make and use the same with absolute exactitude.

In the operation of coupling hose, pipes, or the like, much time is usually lost, and in many instances it is of most vital importance that these operations should be performed quickly and positively,—to accomplish which is the desideratum to which this present invention is more particularly directed.

The object of my present invention, broadly stated, is to provide means for coupling hose, pipes, or the like, in order to successfully form an impermeable joint, which will be strong and durable in construction, easily operated and controlled, which can be manufactured and sold at a comparatively low price, and which will give a maximum of efficiency under all conditions for the several purposes for which it may be employed, and in which the item of maintenance will be reduced to an almost negligible minimum.

The specific objects of this invention are, to provide a coupling in which the elements may be coupled without turning either of the parts, the operation requiring but one movement to form or break the operative connection of the parts; to provide means whereby the coupling may slide easily over any obstruction and not become engaged therewith; in which the wear will be reduced to a minimum; and in which the danger of leakage will be practically *nil*.

Other minor objects and particular advantages of the invention will suggest themselves to the ordinary mechanic in the course of the following description.

My present invention is especially applicable for use in connection with coupling sections of fire-hose, and for connecting hose to hydrants, therefore I have shown it as relating thereto, but I desire that it be understood that I am not to be limited to such particular use.

In the accompanying drawings forming a part of this specification one manner of application of my invention is shown, in which—

Figure 1:
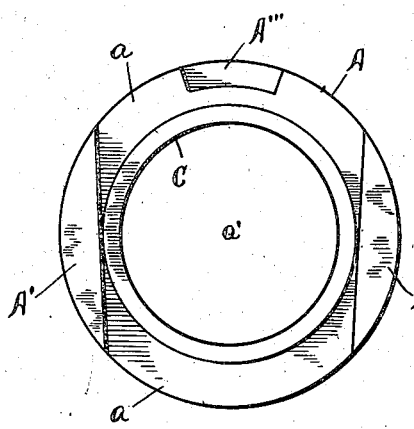
Figure 2:
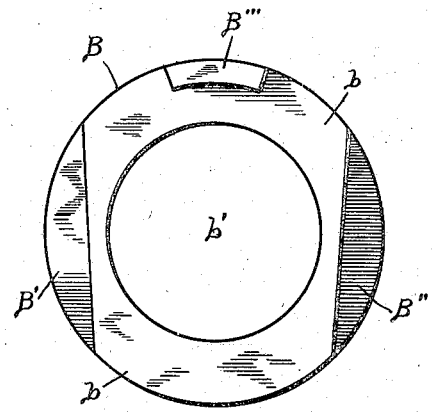
Figure 3:
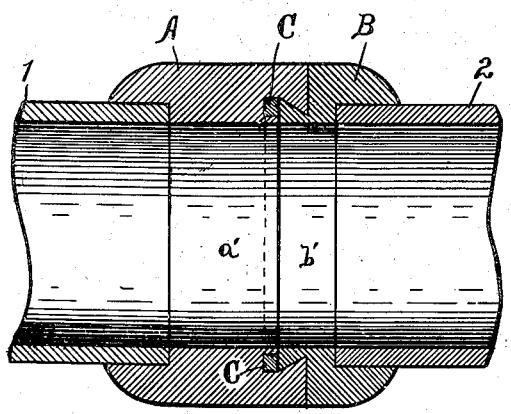
Figure 4:
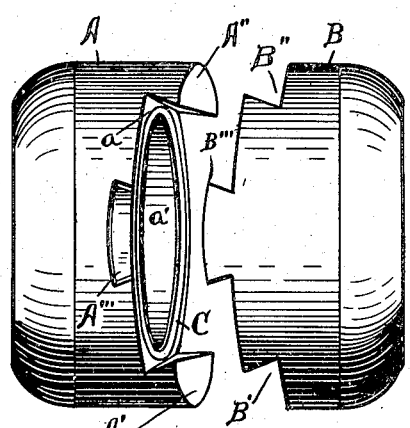
Figure 5:
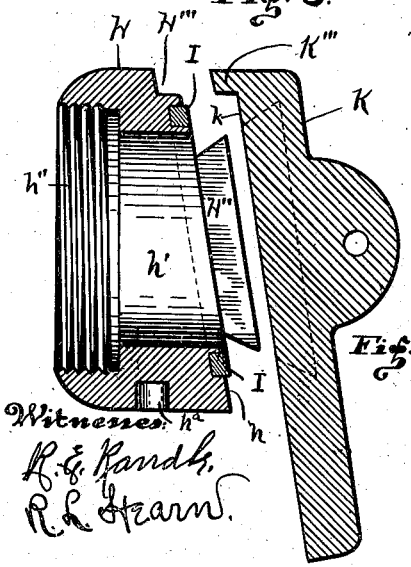
Figure 6:
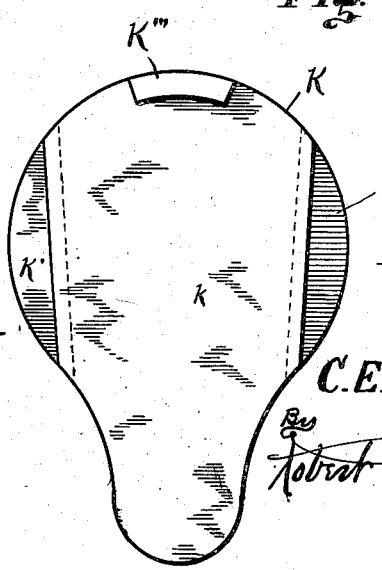

Figure 1 is a face view of the female member; Fig. 2 is a face view of the male member; Fig. 3 is a longitudinal central section of the two members in operative position with relation to each other; Fig. 4 is a perspective plan of the two members separated; Fig. 5 is a longitudinal central section showing the female member adapted to be employed in connection with a hydrant or the like and also showing the cap therefor, which cap is adapted to take the place of the male member; and Fig. 6 is an inside face view of said cap.

Similar indices denote like parts throughout the several views of the one sheet of drawings.

The construction and operation of the one manner of embodiment of my invention I will now set forth with as much exactitude as may be found to be necessary for a clear comprehension of the principles thereof.

Referring first to Figs. 1, 2, 3 and 4 of the drawings, letter A denotes the female member and B the male member of my device, each being formed in the nature of a band, and each is provided with the respective contact faces $a$ and $b$ which are disposed at an angle with reference to the axial direction of the device. The faces $a$ and $b$ are adapted to contact with each other as indicated in Fig. 3. Formed centrally through the member A is the aperture $a'$, and likewise formed through the member B is the complementary aperture $b'$.

Numerals 1 and 2 denote each a portion of a hose or pipe, which are to be coupled together, each being adapted to be secured to the respective members A and B on the inside thereof, as indicated in Fig. 3, there being ways formed around on the inner periphery of the outer end portions of said members A and B to receive the ends of said hose or pipes whereby the apertures in said hose or pipes may be of same size as are the apertures in said members A and B, substantially as indicated. The outer surfaces of said members A and B are rounded at their outer end portions, as indicated in Fig. 3, in order that when coupled the hose may be drawn over rough surfaces without danger of the coupling engaging therewith.

Extending outward from opposite sides of the face *a* are the two undercut tapering flanges A′ and A″, their outer sides conforming to the contour of the member A, with which they are integral; their inner sides projecting under; and their faces being parallel with the face *a*. Said inner faces of said flanges are not parallel with each other but they are arranged convergently with relation to each other as shown.

The index A‴ denotes a cavity sunk into the face *a* and opening into the periphery of the member A at a point midway between the flanges A′ and A″ at their points farthest apart. Both the depth and the thickness of said cavity A‴ are substantially the same, while the length thereof is considerably greater, being substantially that as shown in Figs. 1 and 4. The ends of said cavity A‴ are undercut or dovetailed in an axial direction as indicated in Fig. 4.

Extending inward from opposite sides of the face *b* are the two undercut tapering grooves B′ and B″; their outer sides conforming to the contour of member B, in which they are formed; their inner sides projecting under; and their faces being parallel with the face *b*. Said inner faces of said grooves are not parallel with each other but they are arranged convergently with relation to each other and correspond with the flanges A′ and A″.

The index B‴ denotes a lug projecting out from the face *b*, adjoining the periphery of the member B, located at a point midway between the flanges B′ and B″ at their points farthest apart. The dimensions of the lug B‴ are substantially the same as that of the cavity A‴ in which it is adapted to fit; and the dimensions of the flanges A′ and A″ are substantially the same as are the grooves B′ and B″ in which they are adapted to fit, as indicated in Fig. 3.

Formed around in the face *a* of the member A is a channel, which extends around the aperture *a′*, and in which is fitted the gasket C. Said gasket should be of a thickness such as to cause it normally to extend out slightly above the face *a*, and it is to be contacted by the face *b*, as is indicated in Fig. 3.

From the above it will be manifest that the faces *a* and *b* of the two members are, or may be, detachably interlocked being dovetailed convergently together, and they can be separated only by sliding said faces a short distance upon each other. Gravity, friction, and resiliency all contribute to retain said faces in contact with each other.

Referring now particularly to Figs. 5 and 6: The letter H denotes a female member, which in every essential particular is like the member A, except that it may be adapted for a different purpose, the differences being that the outer portion of the wall of its central aperture *h′*, is cut away, same as member A, but this cutaway portion is interiorly threaded, said threads being denoted by index *h″*, by which it may be secured on a hydrant or the like in place of the usual cap therefor.

The member H has a face *h* which is disposed at an angle with reference to the axial direction of the member H. Extending outward from opposite sides of the face *h* are two undercut flanges, only one of which appears in Fig. 5 where it is denoted by index H″, said flanges being identical with the flanges A′ and A″ which have been described, therefore further description and showing would be prolix.

The index H‴ denotes a cavity sunk into the face *a* and it is identical with the cavity A‴ above described.

Formed around in the face *h* of the member H is a groove which opens into the aperture *h′*, and in which is fitted the gasket I, which is identical with the gasket C above referred to, and its function is the same.

The letter K denotes a cap or plate, having a face *k* which is adapted to contact with the face *b* (or the face *a*). Extending inward from opposite sides of the face *k* are the two undercut tapering grooves K′ and K″ which are identical with the grooves B′ and B″ of the member B.

The index K‴ denotes a lug formed integral with the cap K and which rises above the face *k*, same being identical with the lug B‴, and it is adapted to fit in the cavity H‴.

The member H is adapted to be screwed on to the threaded flange which usually projects from a fire hydrant, where it may remain permanently in position, it being adapted to be run thereon by a wrench which may be engaged in the aperture *h*ª.

In order to protect the face of the member H when not in use, and to close the aperture *h′*, is the function of the cap K which may be brought to the position shown, then raised to allow the flanges of the member H to engage the grooves K′ and K″, after which the cap is lowered wedgelike to position, and its upper end may be tapped in order to tighten it to the desired sufficiency.

Each section of the hose, as for instance sections 1 and 2, is provided at one end with a member A and at the other end with a member B. Should it now be desired to connect up the hose to the hydrant then one has only to remove the cap K, by moving it upward. The next operation will be to connect the hose to the hydrant which is done by selecting the end of the hose which carries a member B and connecting such member B to the member H in same manner that the cap K was connected thereto. After the above one has only to connect together the desired number of sections of hose, these being connected as that shown in Fig. 3.

It of course being understood that a nozzle (not shown) may be provided which has at its butt a member B, whereby it may be connected to the last section of hose.

From the above it is manifest that a line of hose may be laid and connected to a hydrant very quickly, dispensing entirely with threaded connections, and at the same time providing a strong and more positive connection, which is both easily connected and disconnected.

While I have shown and described the best manner now known to me for the accomplishment of my invention in a practical manner, I desire that it be understood that I am not to be limited to the specific details thereof, but hold that I am entitled to such changes therein as would suggest themselves to an ordinary mechanic.

Having now fully shown and described my invention, what I claim and desire to secure by Letters Patent of the United States of America, is—

1. A hose or pipe coupling formed round in cross-section and having its ends rounded in an axial direction, consisting of a male-member and a female-member provided with parallel contact faces disposed at an acute angle with relation to the axial direction of the coupling, the two faces being dovetailed convergently together, a dovetail-lug projecting from the face of the male-member and adjoining the periphery thereof at the wider end of its face and fitting in an oppositely disposed socket formed in the face of the female member, said dovetailed-lug and said socket forming means for contributing in retaining said faces in contact with each other and also preventing said faces from being contacted tighter than they should.

2. A hose or pipe coupling formed round in cross section and comprising two members having oppositely disposed faces which are disposed at an acute angle to the common axis, means for removably connecting said faces, said means comprising a pair of undercut and convergently arranged flanges formed integral with one of said faces and a pair of undercut convergently arranged grooves formed in the face of the other member and adapted to snugly receive said flanges therein wedge-like to draw the two faces tightly into contact with each other, a dovetailed lug projecting from the face of one of said members and adapted to fit in an undercut cavity formed in the face of the other member, said last named cavity and lug being oppositely directed to that of the first named grooves and flanges, and a washer seated in one of said faces and adapted to contact with the other face when the two members are contacted.

In testimony whereof I have hereunto subscribed my name to this specification in the presence of two subscribing witnesses.

CHARLES E. ATKINSON.

Witnesses:
ROBERT W. RANDLE,
R. E. RANDLE.